(12) United States Patent
Russ

(10) Patent No.: US 7,306,430 B2
(45) Date of Patent: Dec. 11, 2007

(54) RAM AIR TURBINE BLADE ROTATION OVER-SPEED PREVENTION MECHANISM

(75) Inventor: David E. Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 366 days.

(21) Appl. No.: 11/136,624

(22) Filed: May 23, 2005

(65) Prior Publication Data

US 2006/0263220 A1     Nov. 23, 2006

(51) Int. Cl.
*F01D 7/02* (2006.01)
(52) U.S. Cl. ......................... 416/46; 416/147
(58) Field of Classification Search ................ 416/44, 416/46, 53, 147, 156
See application file for complete search history.

(56) References Cited

U.S. PATENT DOCUMENTS

| | | | | |
|---|---|---|---|---|
| 4,411,596 A | * | 10/1983 | Chilman | 416/51 |
| 4,743,163 A | * | 5/1988 | Markunas et al. | 416/44 |
| 5,487,645 A | * | 1/1996 | Eccles | 416/51 |
| 7,074,010 B2 | * | 7/2006 | DeGroff et al. | 416/46 |
| 2006/0239817 A1 | * | 10/2006 | Nohr et al. | 416/46 |

* cited by examiner

*Primary Examiner*—Edward K. Look
*Assistant Examiner*—Devin Hanan
(74) *Attorney, Agent, or Firm*—Stephen G. Mican

(57) ABSTRACT

A ram air turbine (RAT) prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism.

19 Claims, 3 Drawing Sheets

Blade pushed to course pitch

Normal operation position

RAM AIR TURBINE BLADE ROTATION OVER-SPEED PREVENTION MECHANISM

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power, or both in the case of a hybrid RAT.

As described in Markunas et al., the turbine includes a speed governor that changes the turbine blade position to maintain a relatively constant shaft speed to the power generating equipment. Failure of the turbine speed governor can cause an over-speed condition that may ultimately cause the release of a turbine blade at very high speed. Due to the high speed, the wayward blade has very high energy as well. The most common cause of governor failure is due to seizure of the bearing between the turbine shaft and the governor yoke plate that controls the pitch of the turbine blades.

The potential release of a high-energy blade proximate the aircraft is a concern for both commercial and military RAT applications. Should the wayward blade strike the aircraft fuselage, it may penetrate the skin and cause damage to electric or hydraulic power equipment or control systems. It may also injure passengers or crew. If one of the propulsion engines ingests the wayward blade, the engine may suffer severe damage that results in loss of thrust.

Current methods to minimise hazards caused by turbine over-speed-induced release of a turbine blade have involved strategic placement of key elements or shields to prevent penetration. These methods no longer satisfy increasingly stringent certification and safety requirements promoted by airworthiness authorities.

SUMMARY OF THE INVENTION

The invention comprises a RAT that prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism.

In a preferred embodiment, the invention comprises an improved RAT for generating emergency aeronautical supplemental power that has a governor for automatically adjusting the pitch of turbine blades rotatingly attached to a RAT turbine hub with an axis of rotation and coupled to a governor mechanism, comprising: a centrifugally operated trigger mechanism attached to the turbine hub responsive to an over-speed condition of the turbine hub; and a release mechanism for each turbine blade responsive to the trigger mechanism that frees the turbine blades from the governor mechanism and lets them assume a fixed coarse pitch condition.

DETAILED DESCRIPTION OF THE INVENTION

As described in Markunas et al., during normal operation RAT speed is controlled with a counterweight/spring governor balance system. As speed increases the centrifugal torque of a blade/counterweight assembly increases. This torque acts through a cam follower and yoke plate slidingly supported by a turbine shaft to compress a helical spring and thus change the position of the yoke plate. The yoke plate engages pins coupled to the blades that move the blades to a coarser angle with movement of the yoke plate and thus extract less power from the air stream. In this way, the turbine speed is controlled over a range of airspeeds, altitudes and loads.

Such a mechanical governor system requires a translation of rotary motion about the axis of the turbine shaft due to the blade/counterweight assembly turning about the blade pitch change axis to axial motion along the turbine shaft such that the force balance with the helical spring can be affected. The translation occurs by means of a roller bearing on the counterweight assembly that engages a bearing surface on the yoke plate. The yoke plate in turn engages the turbine shaft with a linear bearing to slide along the turbine shaft, so that low-friction translation is obtained. Unfortunately, seizure of this linear bearing sometimes occurs and such seizure tends to lock the blades at or near the fine pitch position. In this position, the turbine is most susceptible to over-speed. The invention dramatically reduces the likelihood of over-speed-induced release of a turbine blade due to such a failure of the mechanical governor system.

Figure 1:
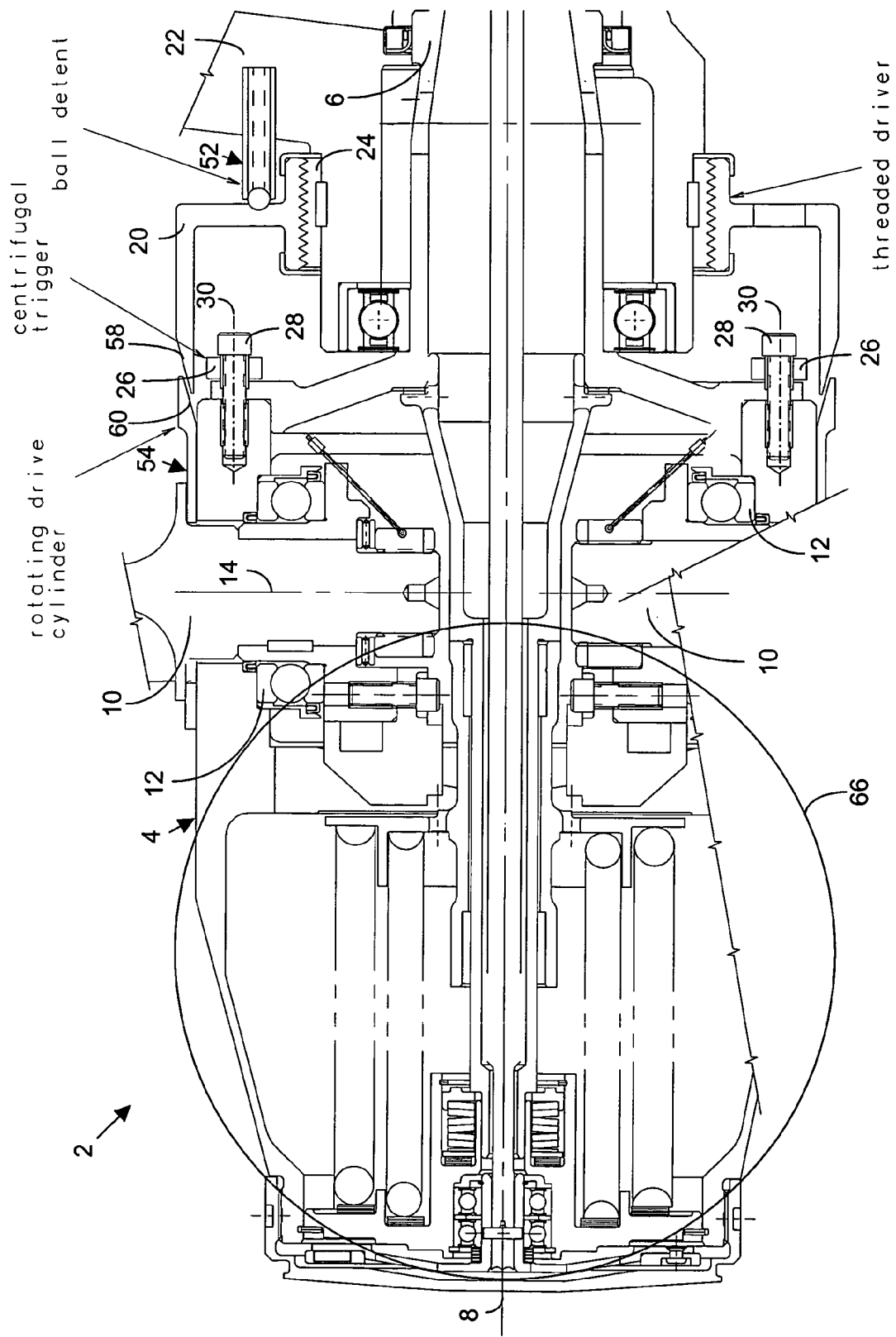
FIG. 1 is a sectional cut-away side view of a RAT that incorporates an embodiment of the invention.

FIG. 1 is a sectional cut-away side view of a RAT 2 that incorporates an embodiment of the invention. The RAT 2 has a turbine hub 4 that has turbine shaft 6 with a turbine shaft axis of rotation 8. Turbine blades 10 rotatingly attached to the turbine hub 4 by bearing assemblies 12 are free to rotate about a turbine blade axis of rotation 14 that is generally perpendicular to the turbine shaft axis of rotation 8.

Figure 2:
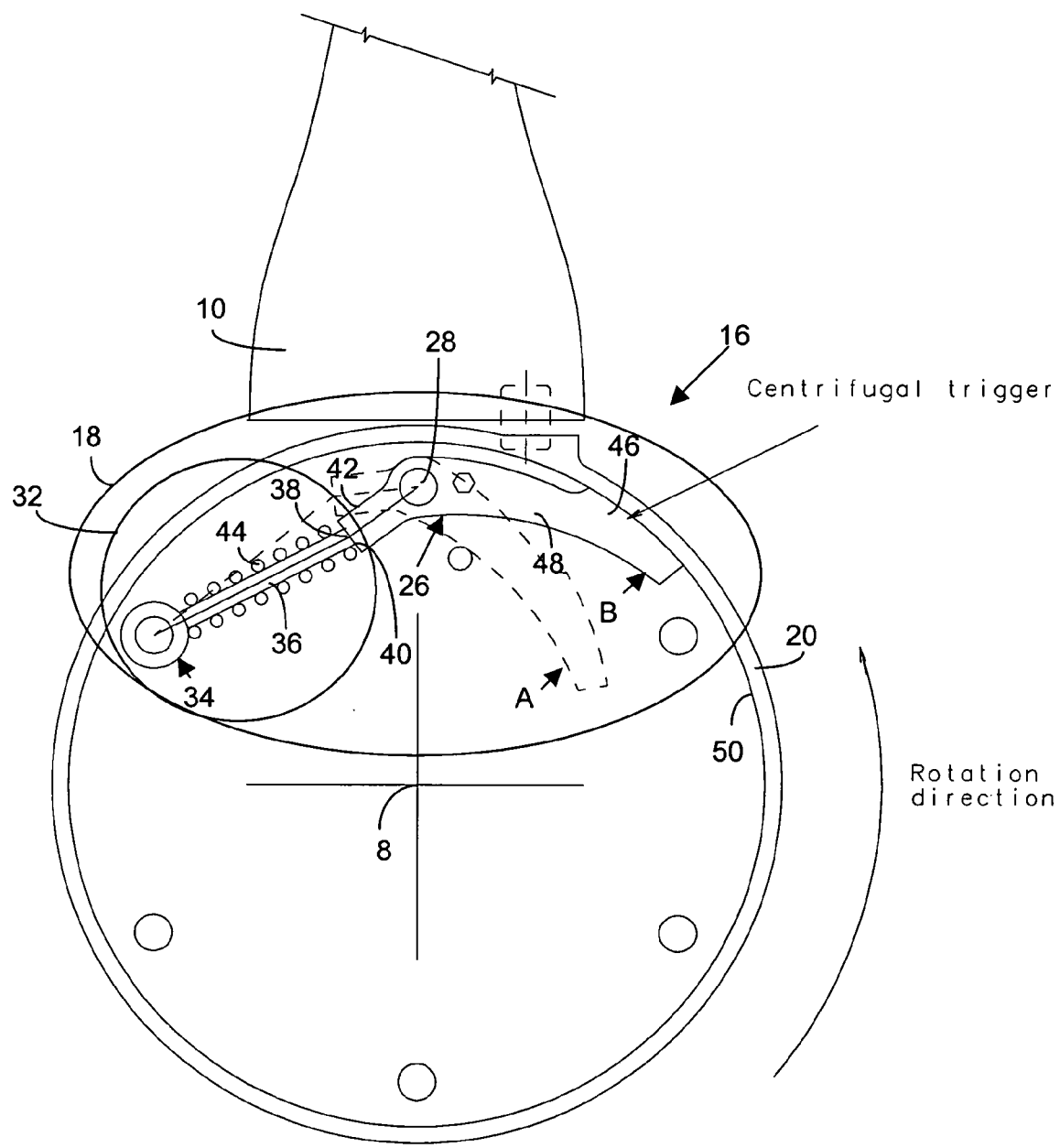
FIG. 2 is a cut-away end view of a hub for a RAT that incorporates an embodiment of the invention that shows a centrifugal trigger mechanism.

Referring to FIGS. 1 and 2 together, the RAT 2 also has a centrifugal trigger mechanism 16 that comprises at least one centrifugal brake assembly 18, and preferably a pair of opposed centrifugal brake assemblies 18, and a threaded driver ring 20 that rotatably attaches to a stationary housing 22 of the RAT 2 by way of a threaded interface 24. Each centrifugal brake assembly 18 comprises a rotary flyweight 26 that rotatably attaches to a flyweight shaft 28 to permit the flyweight 26 a rotary freedom of movement about a flyweight rotational axis 30 that is generally parallel to the turbine shaft axis of rotation 8.

Each centrifugal brake assembly 18 also comprises an over-center toggle mechanism 32. The toggle mechanism 32 conveniently comprises a toggle lever 34 that rotatably fastens to a toggle lever shaft 36 and that has a free end 38 that compressively engages a receptacle 40 in a first end 42 of the rotary flyweight 26 by way of a compression bias spring 44 that sheaths the toggle lever 34.

The toggle mechanism 32 applies a force to bias the rotary flyweight 26 radially inwardly when the RAT 2 runs at or below its normal operating speed. Only when the RAT 2 exceeds the normal operating speed can the centrifugal force of the rotary flyweight 26 exceed the preload bias of the toggle mechanism 32 as established by the bias spring 44. When the centrifugal force of the rotary flyweight 26 exceeds the preload bias of the toggle mechanism 32 during an over-speed condition, the rotary flyweight 26 toggles the toggle lever 34 from a first position "A" shown in broken line to a second position "B" so that the preload bias of the toggle mechanism 32 assists the centrifugal force of the flyweight 26 to let a brake shoe 46 on a second end 48 of the rotary flyweight 26 opposite the first end 42 make contact with an inner surface 50 of the threaded driver ring 20.

Figure 3:
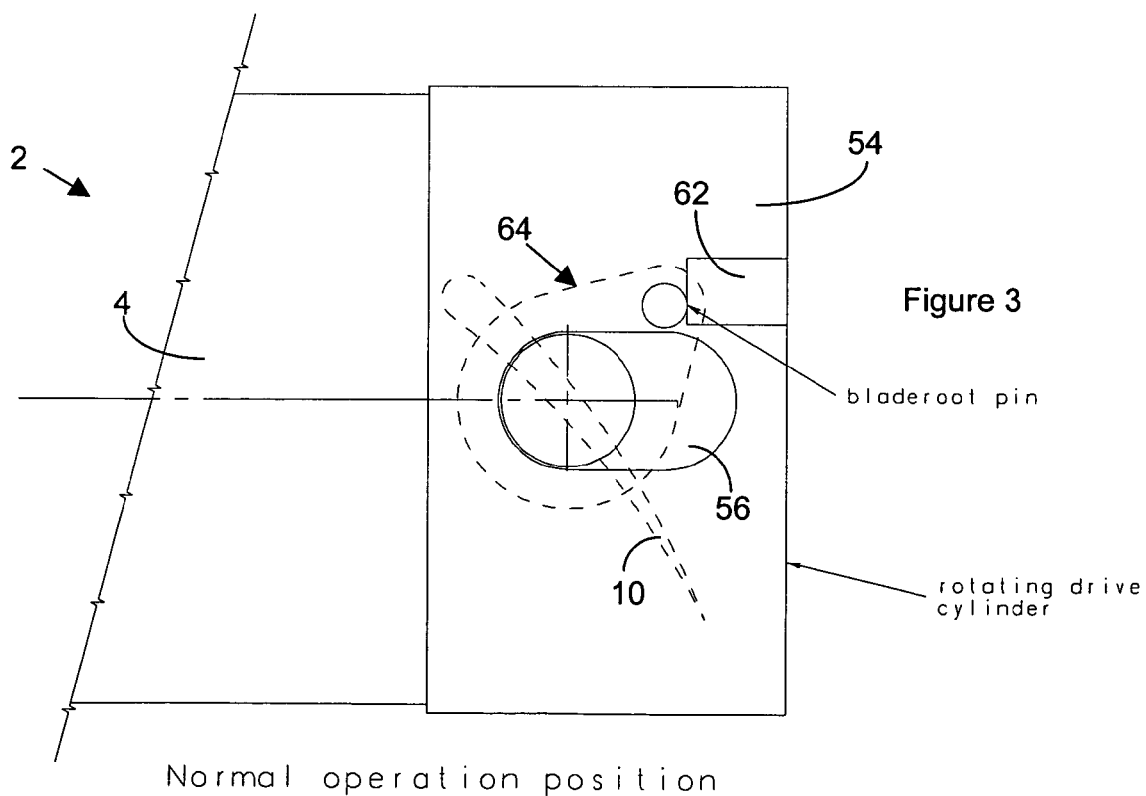
FIG. 3 is a sectional cut-away side view of a hub for a RAT that incorporates an embodiment of the invention that shows a rotating drive cylinder in a normal operation position.

Due to the action of the threaded interface 24, the contact of the brake shoe 46 of each centrifugal brake assembly 18 with the inner surface 50 of the driver ring 20 causes a ball detent assembly 52 that normally holds the driver ring 20 stationary to release and forces the driver ring 20 to rotate inwardly toward a turbine hub drive cylinder 54 that rotates along with the turbine hub 4. As shown in FIG. 3, the rotating drive cylinder 54 has a slot 56 for each turbine blade 10 to allow the drive cylinder 54 to move axially inward along the turbine hub 4 once it overcomes the retaining force of a latch pin (not shown) that engages the drive cylinder. The latch pin normally retains the drive cylinder 54 in an axial position relative to the turbine blades as shown in FIG. 3.

When the driver ring 20 contacts the drive cylinder 54, their mating surfaces 58, 60 cause the drive cylinder to impart a force to the latch pin that overcomes its retaining force on the drive cylinder 54. The mating surfaces 58, 60 are preferably conical as shown in FIG. 1, so that even a small coefficient of friction between the conical mating surfaces 58, 60 can overcome a much larger coefficient of friction on the threads of the threaded interface 24 such that the driver ring 20 continues to push toward the drive cylinder 54 regardless of how much axial force that the driver ring 20 exerts on the drive cylinder 54.

Figure 4:
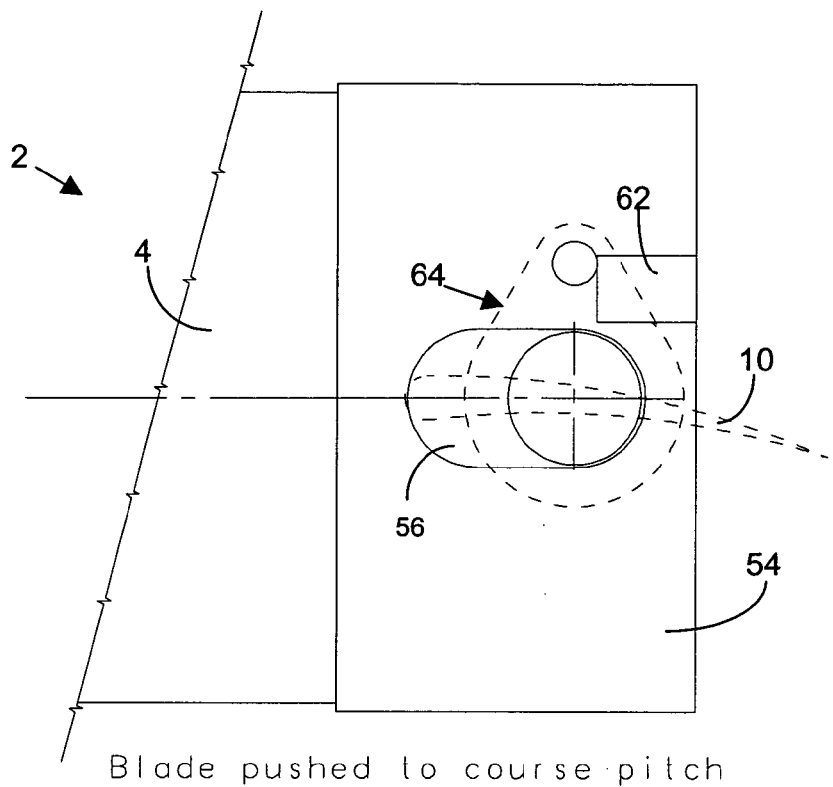
FIG. 4 is a sectional cut-away side view of a hub for a RAT that incorporates an embodiment of the invention that shows a rotating drive cylinder in a triggered position.

As the drive ring 20 axially displaces the drive cylinder 54, a boss 62 on the drive cylinder 54 starts to push a blade root lever 64 that comprises a pin or boss attached to or part of each turbine blade 10. The lever 64 applies a twisting moment on its blade 10 that should free most jams of a governor mechanism 66 in the RAT 2. If this action fails to free such a jam of the governor mechanism 66, the drive ring 20 breaks a shear key (not shown) between the governor mechanism 66 and the turbine blades 10. In any case, the drive ring 20 continues to push the drive cylinder 54 to an axial position such that the boss 62 pushes the lever 64 for each blade 10 until each blade 10 reaches a coarse pitch position, as shown in FIG. 4. The combination of the drive cylinder 54 and the blade root lever 64 thus serve as a release mechanism for the turbine blades 10 responsive to the centrifugal trigger mechanism 16 comprising the centrifugal brake assemblies 18 and threaded driver ring 20 that frees the turbine blades 10 from the governor mechanism 66 and lets them assume a fixed coarse pitch condition.

Once the drive cylinder 54 reaches the axial position shown in FIG. 4, a latch pin (not shown) in the turbine hub 4 pops into a corresponding receptacle or orifice (not shown) in the drive cylinder to axially lock it in place. The drive ring 20 runs off the threads in the threaded interface 24 so it can no longer move axially. The RAT 2 thus continues to operate with its blades 10 in the fully coarse position until the RAT is manually reset and/or refurbished.

The invention as described above comprises a RAT that prevents release of its turbine blades due an over-speed condition by detecting an over-speed condition with a turbine hub-mounted centrifugally operated trigger mechanism and rotating the blades to a fixed coarse pitch position with a release mechanism that responds to the trigger mechanism. It should be understood that this embodiment is only an illustrative implementation of the invention, that the various parts and arrangement thereof may be changed or substituted, and that the invention is only limited by the scope of the attached claims.

What is claimed is:

1. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism, comprising:
    a centrifugally operated trigger mechanism attached to the turbine hub responsive to an over-speed condition of the turbine hub; and
    a release mechanism for each turbine blade responsive to the trigger mechanism that frees the turbine blades from the governor mechanism and lets them assume a fixed coarse pitch condition.

2. The RAT of claim 1, wherein the centrifugally operated trigger mechanism comprises at least one centrifugal brake assembly and a threaded driver ring rotatingly coupled to a stationary housing of the RAT that rotates toward the turbine hub when the RAT exceeds normal operating speed to activate the release mechanism.

3. The RAT of claim 2, wherein the centrifugally operated trigger mechanism comprises a pair of opposed centrifugal brake assemblies.

4. The RAT of claim 2, wherein each centrifugally operated brake assembly comprises a rotary flyweight that toggles a toggle mechanism when its centrifugal force exceeds a preload bias force of the toggle mechanism as the RAT exceeds its normal speed of operation.

5. The RAT of claim 2, wherein each rotary flyweight has a brake shoe that engages an inner surface of the driver ring when the rotary flyweight toggles the toggle mechanism.

6. The RAT of claim 2, wherein the release mechanism comprises a drive cylinder that rotates with the turbine hub and the drive ring engages the drive cylinder when the RAT exceeds its normal speed of operation to move the drive cylinder toward the turbine blades.

7. The RAT of claim 6, wherein movement of the drive cylinder toward the turbine blades forces them to a coarse pitch position.

8. The RAT of claim 7, wherein a boss on the drive cylinder operates a blade root lever attached to each turbine blade to apply a twisting moment to the turbine blade.

9. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism, comprising:
    a centrifugally operated trigger mechanism attached to the turbine hub responsive to an over-speed condition of the turbine hub that comprises at least one centrifugal brake assembly and a threaded driver ring rotatingly coupled to a stationary housing of the RAT that rotates toward the turbine hub when the RAT exceeds normal operating speed; and a release mechanism for each turbine blade comprising a drive cylinder responsive to contact with the trigger mechanism driver ring that frees the turbine blades from the governor mechanism and lets them assume a fixed coarse pitch condition.

10. The RAT of claim 9, wherein the centrifugally operated trigger mechanism comprises a pair of opposed centrifugal brake assemblies.

11. The RAT of claim 9, wherein each centrifugally operated brake assembly comprises a rotary flyweight that toggles a toggle mechanism when its centrifugal force exceeds a preload bias force of the toggle mechanism as the RAT exceeds its normal speed of operation.

12. The RAT of claim 9, wherein each rotary flyweight has a brake shoe that engages an inner surface of the driver ring when the rotary flyweight toggles the toggle mechanism.

13. The RAT of claim 9, wherein movement of the drive cylinder toward the turbine blades forces them to a coarse pitch position.

14. The RAT of claim 13, wherein a boss on the drive cylinder operates a blade root lever attached to each turbine blade to apply a twisting moment to the turbine blade.

15. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism, comprising:

a centrifugally operated trigger mechanism attached to the turbine hub responsive to an over-speed condition of the turbine hub that comprises at least one centrifugal brake assembly with a brake shoe attached to a centrifugal rotary flyweight and a threaded driver ring rotatingly coupled to a stationary housing of the RAT that rotates toward the turbine hub when contacted by the brake shoe when the RAT exceeds normal operating speed; and a release mechanism for each turbine blade comprising a drive cylinder responsive to contact with the trigger mechanism driver ring that operates a blade root lever attached to each turbine blade to apply a twisting moment to the turbine blades that frees the turbine blades from the governor mechanism and forces them to a fixed coarse pitch condition.

16. The RAT of claim 15, wherein the centrifugally operated trigger mechanism comprises a pair of opposed centrifugal brake assemblies.

17. The RAT of claim 15, wherein each rotary flyweight toggles a toggle mechanism to engage its brake shoe when its centrifugal force exceeds a preload bias force of the toggle mechanism as the RAT exceeds its normal speed of operation.

18. An improved ram air turbine (RAT) for generating emergency aeronautical supplemental power that has a governor for automatically adjusting the pitch of turbine blades rotatingly attached to a RAT turbine hub with an axis of rotation and coupled to a governor mechanism, comprising:

a centrifugally operated trigger mechanism attached to the turbine hub responsive to an over-speed condition of the turbine hub that comprises a pair of opposed centrifugal brake assemblies that each have a brake shoe attached to a centrifugal rotary flyweight and a threaded driver ring rotatingly coupled to a stationary housing of the RAT that rotates toward the turbine hub when contacted by the brake shoe when the RAT exceeds normal operating speed; and a release mechanism for each turbine blade comprising a drive cylinder responsive to contact with the trigger mechanism driver ring that operates a blade root lever attached to each turbine blade to apply a twisting moment to the turbine blades that frees the turbine blades from the governor mechanism and forces them to a fixed coarse pitch condition.

19. The RAT of claim 18, wherein each rotary flyweight toggles a toggle mechanism to engage its brake shoe when its centrifugal force exceeds a preload bias force of the toggle mechanism as the RAT exceeds its normal speed of operation.

* * * * *